US012062233B2

(12) United States Patent
Tokitake et al.

(10) Patent No.: US 12,062,233 B2
(45) Date of Patent: Aug. 13, 2024

(54) INFORMATION PROCESSING APPARATUS AND INFORMATION PROCESSING METHOD

(71) Applicant: SONY CORPORATION, Tokyo (JP)

(72) Inventors: Miki Tokitake, Tokyo (JP); Hiroaki Toriumi, Tokyo (JP); Katsuji Miyazawa, Tokyo (JP); Shoji Watanabe, Tokyo (JP); Tetsuo Ikeda, Tokyo (JP); Yoshihito Ichiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 629 days.

(21) Appl. No.: 17/278,512

(22) PCT Filed: Sep. 6, 2019

(86) PCT No.: PCT/JP2019/035242
§ 371 (c)(1),
(2) Date: Mar. 22, 2021

(87) PCT Pub. No.: WO2020/071057
PCT Pub. Date: Apr. 9, 2020

(65) Prior Publication Data
US 2022/0036076 A1 Feb. 3, 2022

(30) Foreign Application Priority Data
Oct. 1, 2018 (JP) .................. 2018-186422

(51) Int. Cl.
*G06V 20/20* (2022.01)
*G03B 21/26* (2006.01)
(Continued)

(52) U.S. Cl.
CPC ............. *G06V 20/20* (2022.01); *G03B 21/26* (2013.01); *G06F 3/0425* (2013.01); *G06V 20/64* (2022.01)

(58) Field of Classification Search
CPC ...... G06V 20/20; G06V 20/64; G06V 10/764; G03B 21/26; G06F 3/0425; G06F 3/0484; G06F 3/0487; G09G 5/00; G09G 5/38
See application file for complete search history.

(56) References Cited

U.S. PATENT DOCUMENTS

2014/0334691 A1* 11/2014 Cho .................. G06Q 30/0631
382/110
2015/0168821 A1 6/2015 Negretti
(Continued)

FOREIGN PATENT DOCUMENTS

CN 203812418 * 9/2014 ............. G06Q 50/12
CN 203812418 U 9/2014
(Continued)

OTHER PUBLICATIONS

Turk, Victoria, "This London restaurant is using 3D projection to bring food to life", Wired [Internet], Britain, Nov. 25, 2017.
(Continued)

*Primary Examiner* — Amara Abdi
(74) *Attorney, Agent, or Firm* — CHIP LAW GROUP

(57) ABSTRACT

There is provided an information processing apparatus including a projection control unit (150) that causes visual information to be projected onto a projection surface. The visual information corresponds to content that is provided to the projection surface and disposed on a first object. The content is identified on the basis of a recognition result of the first object and a recognition result of a second object. The second object is provided along with the first object.

18 Claims, 14 Drawing Sheets

(51) Int. Cl.
  *G06F 3/042* (2006.01)
  *G06V 20/64* (2022.01)

(56) References Cited

U.S. PATENT DOCUMENTS

| | | | | |
|---|---|---|---|---|
| 2015/0206259 A1* | 7/2015 | Takahashi | ............ | G06V 20/52 |
| | | | | 705/15 |
| 2017/0031530 A1* | 2/2017 | Ikeda | ........................ | H04N 5/74 |

FOREIGN PATENT DOCUMENTS

| | | | | |
|---|---|---|---|---|
| CN | 105830005 | A | | 8/2016 |
| CN | 107748655 | * | | 3/2018 ............ G06Q 50/12 |
| CN | 107748655 | A | | 3/2018 |
| EP | 2 937 855 | * | | 10/2015 ............ G06G 5/00 |
| EP | 3089011 | A1 | | 11/2016 |
| JP | 2004252497 | * | | 9/2004 ............ G06Q 50/12 |
| JP | 2004252497 | A | | 9/2004 |
| JP | 2013502606 | A | | 1/2013 |
| JP | 2013114315 | A | | 6/2013 |
| JP | 2014141049 | A | | 8/2014 |
| JP | 2014211748 | A | | 11/2014 |
| JP | 2015-138452 | A | | 7/2015 |
| JP | 2016042246 | A | | 3/2016 |
| JP | 2016506562 | A | | 3/2016 |
| JP | 2016-194762 | A | | 11/2016 |
| JP | 2018101312 | A | | 6/2018 |
| JP | 2018116471 | A | | 7/2018 |
| KR | 10-2016-0102179 | A | | 8/2016 |
| RU | 2016124466 | A | | 12/2017 |
| TW | 201525772 | A | | 7/2015 |
| WO | WO-2014097706 | A1 | | 6/2014 |
| WO | 2015/098187 | A1 | | 7/2015 |
| WO | WO-2015098189 | A1 | | 7/2015 |
| WO | WO-2015098190 | A1 | | 7/2015 |

OTHER PUBLICATIONS

International Search Report and Written Opinion of PCT Application No. PCT/JP2019/035242, issued on Nov. 26, 2019, 09 pages of ISRWO.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/035242 filed on Sep. 6, 2019, which claims priority benefit of Japanese Patent Application No. JP 2018-186422 filed in the Japan Patent Office on Oct. 1, 2018. Each of the above-referenced applications is hereby incorporated herein by reference in its entirety.

TECHNICAL FIELD

The present disclosure relates to an information processing apparatus, an information processing method, and a recording medium.

BACKGROUND ART

In recent years, a variety of techniques have been developed of displaying information corresponding to a recognized object. For example, PTL 1 below describes a technique of controlling the display of pieces of information related to a variety of objects and the display of information in which even the context of a user is taken into consideration on the basis of recognition results of the objects.

CITATION LIST

Patent Literature

PTL 1: Japanese Unexamined Patent Application Publication No. 2016-194762

SUMMARY OF THE INVENTION

Problems to be Solved by the Invention

Incidentally, for example, an action of a user on an object may dynamically change the situation of the object itself. However, it is sometimes difficult for the technique described in PTL 1 to perform display control over information in accordance with the situation.

Means for Solving the Problems

According to the present disclosure, there is provided an information processing apparatus including a projection control unit that causes visual information to be projected onto a projection surface. The visual information corresponds to content that is provided to the projection surface and disposed on a first object. The content is identified on the basis of a recognition result of the first object and a recognition result of a second object. The second object is provided along with the first object.

In addition, according to the present disclosure, there is provided an information processing method including causing, by a processor, visual information to be projected onto a projection surface. The visual information corresponds to content that is provided to the projection surface and disposed on a first object. The content is identified on the basis of a recognition result of the first object and a recognition result of a second object. The second object is provided along with the first object.

According to the present disclosure, there is provided a computer-readable recording medium having a program recorded thereon. The program causes a computer to achieve a projection control function of causing visual information to be projected onto a projection surface. The visual information corresponds to content that is provided to the projection surface and disposed on a first object. The content is identified on the basis of a recognition result of the first object and a recognition result of a second object. The second object is provided along with the first object.

MODES FOR CARRYING OUT THE INVENTION

Figure 1:
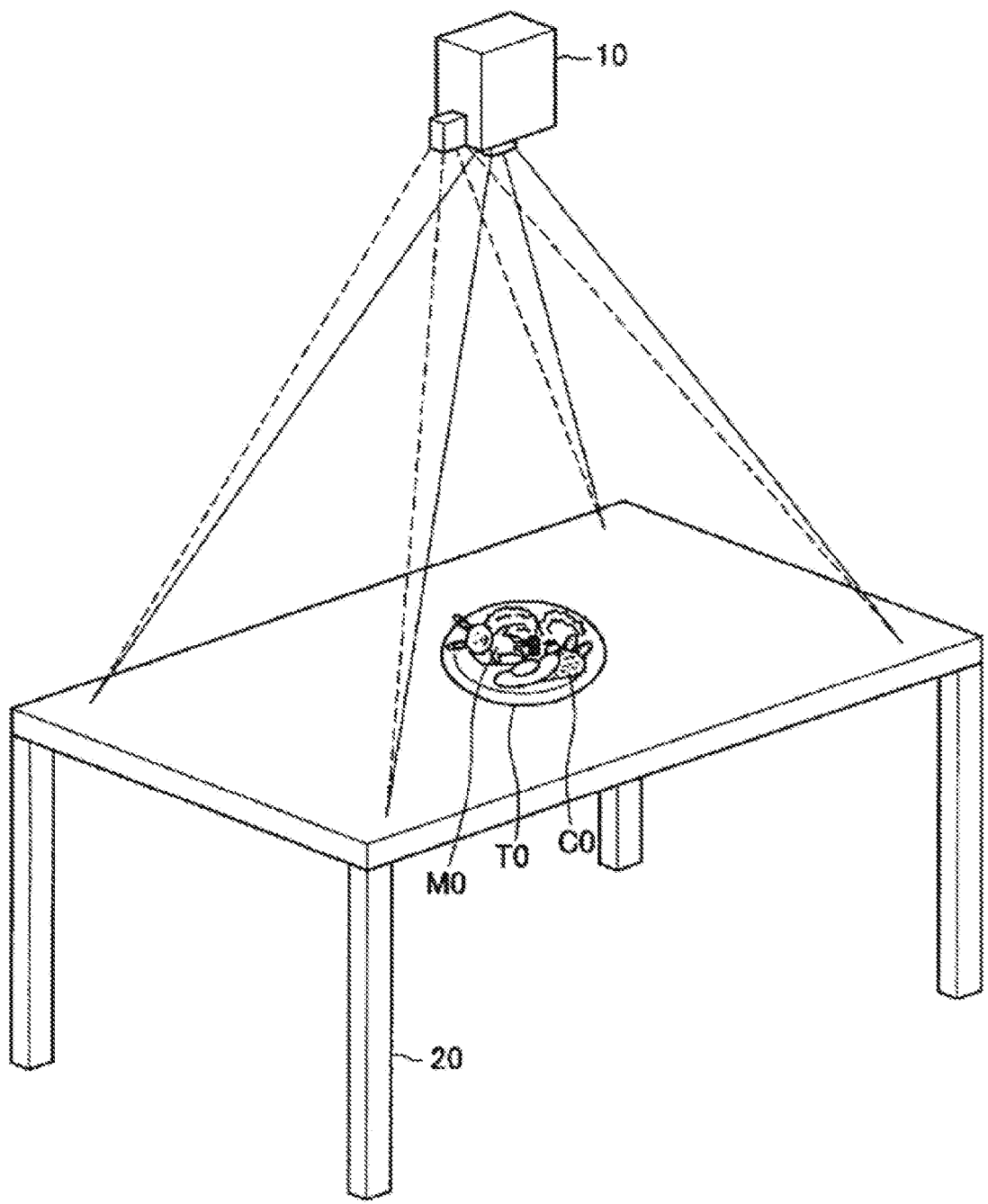
FIG. 1 is a diagram illustrating an overview of a projection apparatus 10 according to an embodiment of the present disclosure.

The following describes a preferred embodiment of the present disclosure in detail with reference to the accompanying drawings. It is to be noted that, in this description and the drawings, components that have substantially the same functional configuration are provided with the same signs and redundant description thereof is thus omitted.

In addition, in the present specification and the drawings, a plurality of components having substantially the same functional configuration may be distinguished by adding different alphabets after the same sign. For example, a plurality of components having substantially the same functional configuration are distinguished like food C0 and food C1 if necessary. Only the same sign is, however, provided to a plurality of components having substantially the same functional configuration in a case where there is no particular need to distinguish them. For example, in a case where it is not necessary to tell the difference between the food C0 and the food C1 in particular, the food C0 and the food C1 are simply referred to as food C.

It is to be noted that description is given in the following order.
1. Embodiment
1-1. Overview
1-2. Functional Configuration Example
1-3. Control Example
2. Hardware Configuration Example
3. Conclusion 1. Embodiment 1-1. Overview First, an overview of the present invention is described.

In recent years, a variety of techniques have been developed that pertain to display control. The display control is performed over information in accordance with a recognition result of an object. Incidentally, in a case where the situation of an object itself changes, it is sometimes difficult to recognize the object. For example, in a situation in which an object to be recognized is adjacent to another object, it is difficult to recognize the outer shape of the object to be recognized. It may be possibly impossible to continue display control over information.

In addition, as a method of recognizing an object, a method is also conceivable in which a predetermined provided thing is used. The provided thing here is a thing that is provided to an object to allow the object to be recognized. The recognition of a provided thing makes it possible to indirectly identify an object and display information corresponding to the object. It is, however, difficult for the method to identify an object on the basis of a provided thing, for example, in a case where the provided thing is detached from the object. It may be possibly impossible to continue the display of the information.

In addition, the state of an object itself may change in some situations, for example, like food is eaten by a user. For example, in a case where the outer shape of an object changes in this way, it is also considered difficult to keep on recognizing the object.

The technical idea according to the embodiment of the present disclosure has been conceived by focusing on the points described above. A combination of recognition results of a plurality of objects makes it possible to continuously identify an object to be recognized and display information corresponding to the object. In addition, an object is continuously recognized even in a case where the state of the object itself changes. Information corresponding to the state change is displayed.

Therefore, as one of features, the projection apparatus according to the embodiment of the present disclosure causes visual information to be projected onto the projection surface. The visual information corresponds to the content that is provided to the projection surface and disposed on the first object. The content is identified on the basis of a recognition result of the first object and a recognition result of the second object. The second object is provided along with the first object.

The feature makes it possible to identify the content on the basis of a recognition result of the second object, for example, even in a case where the first object is adjacent to another object. In addition, the feature makes it possible to identify the content on the basis of a recognition result of the second object, for example, even in a case where the second object is detached from the content. In addition, the feature makes it possible to continuously identify the content even in a situation in which the state of the content changes as compared with a case where content itself is recognized.

It is to be noted that the following describes, as an example, a case where the content is food (food product), the first object is a plate, and the second object is a decoration. Here, examples of the decoration include an edible film and the like.

First, the overview according to the present embodiment is described with reference to FIG. 1.

FIG. 1 is a diagram illustrating an overview of a projection apparatus 10 according to the embodiment of the present disclosure. FIG. 1 illustrates the projection apparatus 10, a table 20, a plate T0, the food C0, and a decoration M0. Here, the food C0 is put on the plate T0 and the decoration M0 is put on the food C0. The plate T, the food C, and the decoration M are described below.

The projection apparatus 10 includes a camera. For example, the projection apparatus 10 images the top of the table 20. In addition, the projection apparatus 10 includes a depth sensor to acquire depth information. In addition, the projection apparatus 10 may include an RGB sensor to acquire color information. In addition, the projection apparatus 10 may further include a sound input device such as a microphone to pick up a sound emitted from a user or an environmental sound of the surrounding environment.

The projection apparatus 10 is able to recognize the positions of objects (e.g., the plate T and the decoration M) positioned on the top of the table 20 by analyzing an image captured by the camera.

In addition, the projection apparatus 10 is able to acquire depth information of the object by analyzing the depth information. The projection apparatus 10 is able to identify, for example, the position and size of the plate T on the basis of the depth information. In addition, the projection apparatus 10 may include a speaker that outputs a sound.

In addition, the projection apparatus 10 projects visual information onto the table 20. Here, the visual information includes, for example, a predetermined animation, still image, character, and the like. The projection apparatus 10 may include a projector. For example, as illustrated in FIG. 1, the projection apparatus 10 may be disposed to be spaced apart from the table 20 by a predetermined distance to be opposed to the top of the table 20. In this case, the projection apparatus 10 is able to project visual information onto the top of the table 20.

For example, the projection apparatus 10 may project the visual information corresponding to the recognized food C onto the projection surface of the table 20. Here, the projection surface refers to a region on the table 20 onto which visual information is projected. The region is, for example, the top of the table 20.

Figure 2:
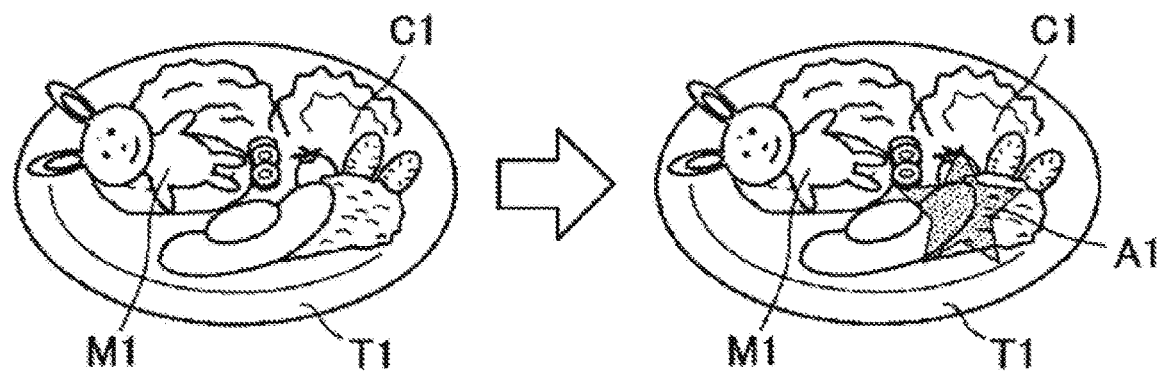
FIG. 2 is a diagram for describing an example of a relationship between a first object, a second object, content, and visual information corresponding to the first object and the second object.

FIG. 2 is a diagram for describing an example of the relationship between the first object, the second object, the content, and the visual information corresponding to the first object and the second object. The left part of FIG. 2 illustrates the first object, the content, and the second object. The content and the second object are disposed on the first object. The projection apparatus 10 makes a projection onto the projection surface on the basis of a recognition result of the first object and a recognition result of the second object. The first object and the second object are provided to the table 20.

Here, the first object and the second object are associated with each of pieces of content. In the example of FIG. 2, a plate T1 and a decoration M1 are associated with the food C1. In addition, visual information to be projected is associated with each of pieces of content. In the example of the right part of FIG. 2, an animation A1 is associated with the food C1.

In the example of FIG. 2, the projection apparatus 10 recognizes the plate T1 and the decoration M1 and identifies the food C1 on the basis of the association described above. Next, the projection apparatus 10 projects the animation A1 corresponding to the food C1 onto the food C1 on the basis of the association described above. Here, the positional relationship is defined in advance between the first object, the second object, and the visual information.

As described above, according to the present disclosure, it is possible to project visual information more accurately.

For example, even in a case where a plurality of plates is adjacent to each other in a scene of a meal or even in a case where an edible film put on food is removed at the start of a meal, it is possible to identify the food serving as the content and present visual information corresponding to the food to a user.

The following describes projection control performed over visual information on the basis of a recognition result of the first object and a recognition result of the second object.

<1-2. Functional Configuration Example>

Figure 3:
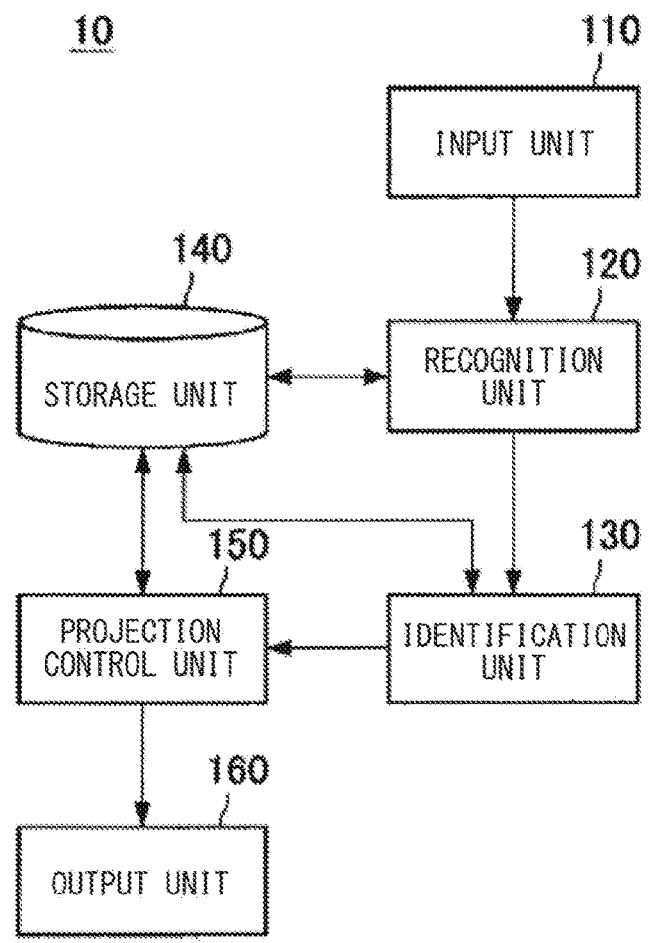
FIG. 3 is a diagram for describing an example of a functional configuration of the projection apparatus 10 according to the embodiment.

Next, a functional configuration example of the projection apparatus 10 according to the present embodiment is described. FIG. 3 is a diagram for describing an example of a functional configuration of the projection apparatus 10 according to the present embodiment. As illustrated in FIG. 3, the projection apparatus 10 includes an input unit 110, a recognition unit 120, an identification unit 130, a storage unit 140, a projection control unit 150, and an output unit 160.

The input unit 110 according to the present embodiment has a function of receiving various kinds of information for the input unit 110. For example, the input unit 110 has a camera and a depth sensor as described above. The camera images the top of the table 20. The depth sensor acquires depth information regarding the top of the table 20. The depth sensor may be, for example, a time-of-flight type sensor or a structured-light type sensor. In addition, the input unit 110 may acquire seismic intensity information by using a stereo camera.

It is to be noted that a range within which visual information is projected by the output unit 160 and a range within which the input unit 110 receives the input of information may be the same or different from each other. For example, the input unit 110 may acquire image data or depth information from a wider range than the projection range of the output unit 160. In addition, the projection apparatus 10 may include an RGB sensor to acquire color information.

The recognition unit 120 according to the present embodiment has a function of recognizing the first object and the second object. The recognition unit 120 executes recognition by using information such as image data acquired by the input unit 110. Specifically, the recognition unit 120 is able to recognize the position and size of the first object and the type, position, size, and the like of the second object. In that case, the position of the first object and the position of the second object to be recognized by the recognition unit 120 may be the centers of the respective objects.

Figure 4:
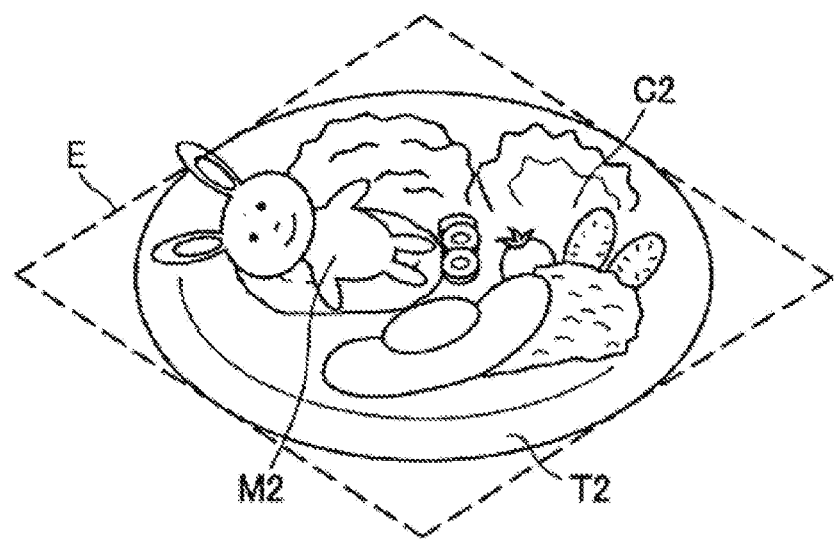
FIG. 4 is a diagram for describing an example of a method of recognizing size of the first object according to the embodiment.

FIG. 4 is a diagram for describing an example of a method of recognizing the size of the first object. FIG. 4 illustrates a plate T2, food C2, a decoration M2, and a recognition rectangle E. As illustrated in the example of FIG. 4, the recognition unit 120 may recognize the size of the recognition rectangle E as the size of the plate T2. The size of the recognition rectangle E is the smallest rectangle surrounding the plate T2. It is to be noted that the recognition unit 120 provides information indicating the recognized size to the identification unit 130. In that case, the size of the smallest rectangle may have a predetermined width (range).

In addition, the recognition unit 120 may recognize a state change in the content. The state change here refers, for example, to a change or the like brought about on the basis of an interaction of a user with content. In addition, the state change may also be a change such as the dissolution of a food product that does not includes the interaction of a user with the content. For example, the state change may include a mass change in the content. In a case where the recognition unit 120 recognizes a state change in the content, the recognition unit 120 provides information indicating the state change to the identification unit 130 described below.

In addition, the recognition unit 120 may continuously recognize the first object, the second object, and the content. The continuous recognition allows the recognition unit 120 to recognize, for example, a state change in the content.

The description is given with reference to FIG. 3 again.

The identification unit 130 according to the present embodiment has a function of identifying the content on the basis of a recognition result of the first object and a recognition result of the second object. Specifically, the identification unit 130 identifies the content on the basis of the combination of the first object and the second object stored in the storage unit 140 and the association data of the content. The storage unit 140 is described below. For example, the identification unit 130 identifies the food C associated with the decoration M recognized by the recognition unit 120 on the basis of the association data stored in the storage unit 140.

The identification unit 130 provides information indicating the identified content to the projection control unit 150.

It is to be noted that the identification unit 130 may acquire the content associated with the second object and also acquire information indicating the size of the first object corresponding to the second object. Here, the size indicated by the information may have a predetermined range. The identification unit 130 compares the size indicated by the acquired information and the size recognized by the recognition unit 120. In a case where a result of the comparison indicates that the size of the first object recognized by the recognition unit 120 is not included in the predetermined range, the identification unit 130 may provide information indicating that the size of the second object is not included in the predetermined range to the projection control unit 150 described below.

The storage unit 140 according to the present embodiment stores data. The storage unit 140 stores information related to the first object, the second object, the content, and the visual information. In addition, the storage unit 140 may store information regarding the combination of the first object and the second object. In addition, the storage unit 140 may store the association of the combination with the content, the association of the content with the visual information, and the like. The information described above may be achieved in the form of, for example, a relational database or the like.

The projection control unit 150 according to the present embodiment has a function of causing the output unit 160 to project visual information onto the projection surface on the basis of a recognition result of the first object and a recognition result of the second object. Specifically, the projection control unit 150 controls the output unit 160 to cause the output unit 160 to project the visual information associated with the content identified by the identification unit 130 onto the projection surface. In that case, the projection control unit 150 acquires the visual information identified by the identification unit 130 on the basis of the association data of the content stored in the storage unit 140 and the visual information. Details of the control of the projection control unit 150 are described below.

The output unit 160 according to the present embodiment projects visual information onto the projection surface under the control of the projection control unit 150.

It is to be noted that, for example, as illustrated in FIG. 1, the projection apparatus 10 may be disposed to be spaced apart from the table 20 by a predetermined distance to be opposed to the top of the table 20. The projection apparatus 10 does not, however, necessarily have to be positioned directly above the table 20 as illustrated in FIG. 1. For example, the projection apparatus 10 may be disposed to allow visual information to be diagonally projected onto the table 20. In addition, the projection apparatus 10 may be, for example, a pendant light or a desk stand light. Such a scheme of displaying information on the top of the table 20 from above is also referred to as "projection type".

The above has described the functional configuration example of the projection apparatus 10 according to the present embodiment. It is to be noted that the configuration described above with reference to FIG. 3 is merely an example. The functional configuration of the projection apparatus 10 according to the present embodiment is not limited to the example. For example, the projection apparatus 10 does not necessarily have to include all of the components illustrated in FIG. 3. For example, it is also possible to include the recognition unit 120, the identification unit 130, the storage unit 140, and the projection control unit 150 in another apparatus different from the projection apparatus 10. It is possible to flexibly modify the functional configuration of the projection apparatus 10 according to the present embodiment in accordance with the specifications and operations. It is to be noted that the projection apparatus 10 may be a smartphone.

1-3. Control Example

Figure 5:
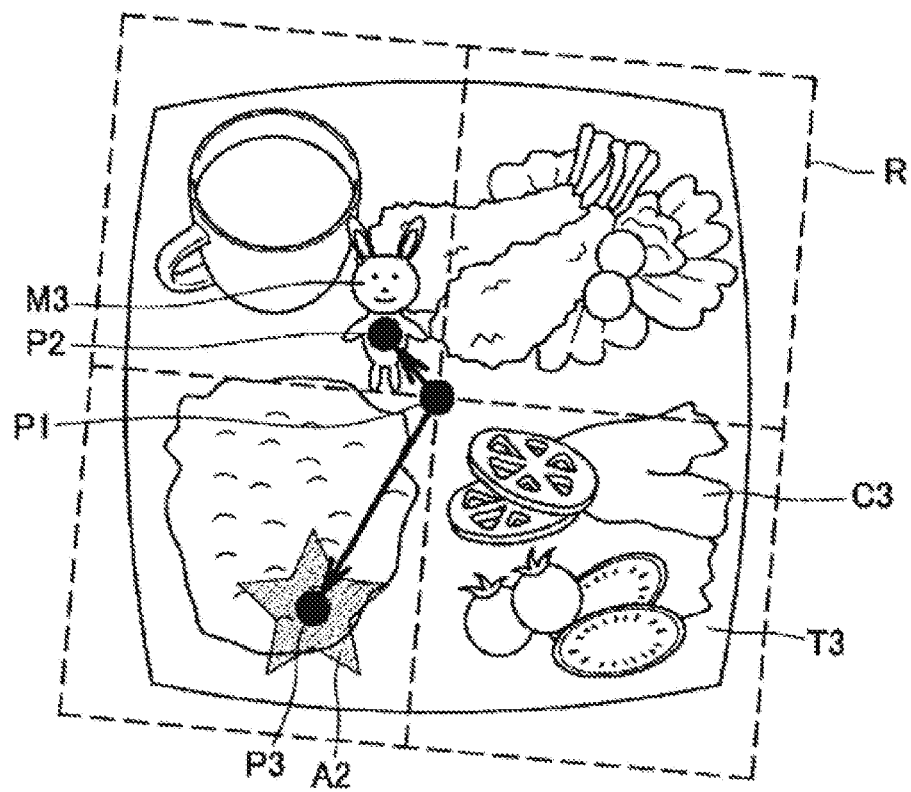
FIG. 5 is a diagram for describing projection control by a projection control unit 150 according to the embodiment.

Next, a projection of visual information by the projection apparatus 10 according to the present embodiment is described. FIG. 5 is a diagram for describing an example of projection control by the projection control unit 150. FIG. 5 illustrates a plate T3, food C3, a decoration M3, and an animation A2.

The projection control unit 150 controls the output unit 160 to cause the output unit 160 to project the visual information corresponding to the content onto the projection surface on the basis of a recognition result of the first object and a recognition result of the second object. Specifically, the projection control unit 150 determines a position for causing the output unit 160 to project the visual information on the basis of the position of the first object and the position of the second object recognized by the recognition unit 120. The projection control unit 150 controls the output unit 160 to cause the output unit 160 to project the visual information at the determined position.

In the example of FIG. 5, the projection control unit 150 determines a projection position P3 of the animation A2 on the basis of a position P1 of the plate T3 and a position P2 of the decoration M3. Here, the projection position P3 may be determined, for example, on the basis of a two-dimensional coordinate system in which the direction of the position P2 of the decoration M3 serves as a Y axis direction with the position P1 of the plate T3 as the origin. In addition, the projection control unit 150 may determine the projection position P3, for example, on the basis of a two-dimensional coordinate system in which the longitudinal direction of the decoration M3 serves as the Y axis direction.

The projection control unit 150 is able to control a position for projecting the visual information in this way on the basis of the position of the first object and the position of the second object recognized by the recognition unit 120. The function makes it possible to project visual information at a more accurate position.

The above has described the case where the first object and the second object are both correctly recognized. Some situations at the time of recognition, however, cause the first object and the second object to be both incorrectly recognized. For example, in a case where the first object is in contact with another first object, the recognition unit 120 may possibly recognize the first object, the other first object, and the like as one first object collectively. The size of the first object recognized by the recognition unit 120 is not thus included in the predetermined range set as the size of the first object corresponding to the second object that is recognized together. In the case described above, the projection control unit 150 may control a projection of the visual information onto the projection surface on the basis of the position of the second object.

Figure 6:
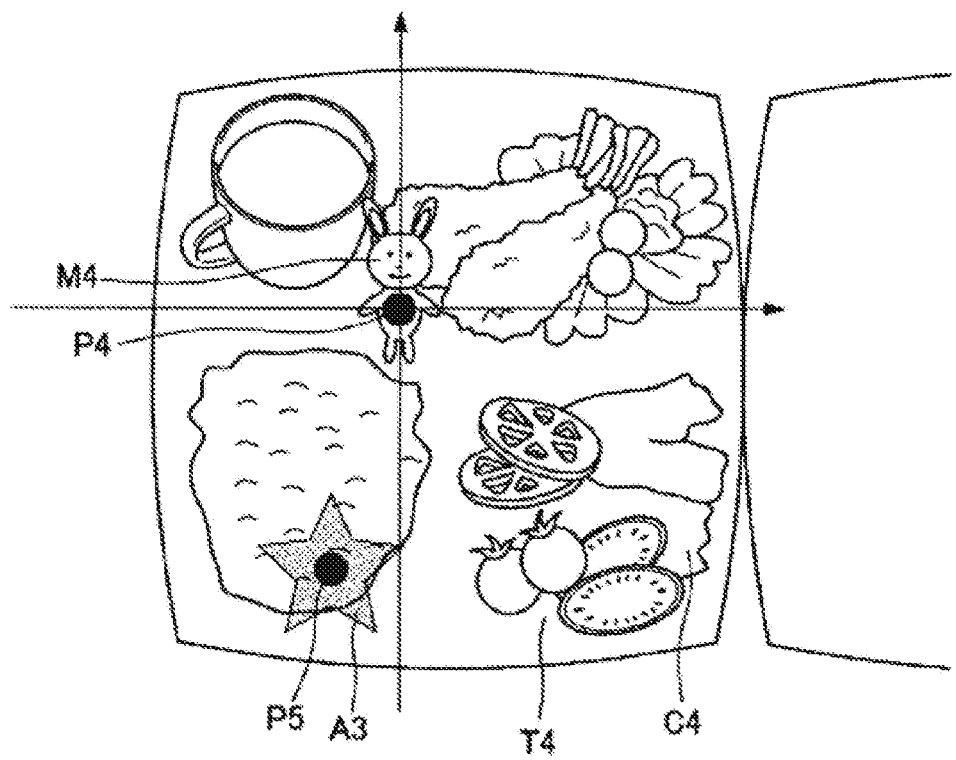
FIG. 6 is a diagram for describing an example of projection control performed by the projection control unit 150 according to the embodiment over visual information on the basis of a recognition result of the second object.

FIG. 6 is a diagram for describing an example of control performed by the projection control unit 150 over a projection of the visual information on the basis of a recognition result of the second object. FIG. 6 illustrates a plate T4, food C4, and a decoration M4.

When the size of the first object recognized by the recognition unit 120 is not included in the predetermined range, the projection control unit 150 causes the output unit 160 to project the visual information corresponding to the content onto the projection surface on the basis of a recognition result of the second object. Specifically, the projection control unit 150 determines a position for causing the visual information to be projected on the basis of the position of the second object recognized by the recognition unit 120. The projection control unit 150 controls the output unit 160 to cause the output unit 160 to project the visual information at the determined position.

In the example of FIG. 6, the plate T4 is adjacent to another plate T. This causes the recognition unit 120 to recognize the first object larger in size than the plate T4 combined with the decoration M4. The projection control unit 150 determines a projection position P5 of an animation A3 from a position P4 of the decoration M4 on the basis of a recognition result of the recognition unit 120. Here, the projection position P5 may be determined, for example, on the basis of a two-dimensional coordinate system in which the longitudinal direction of the decoration M4 in an image inputted to the input unit 110 serves as the Y axis direction with the position P4 of the decoration M4 as the origin.

Even in a case where the projection control unit 150 is not able to recognize the central coordinates of the first object, the projection control unit 150 is able to cause the visual information to be projected on the basis of the position of the second object in this way. The function makes it possible to continue a projection of visual information even in a case where the situation of the first object is not suitable for recognition.

Meanwhile, in a case where the recognition unit 120 is not able to recognize the central coordinates of the first object, the projection control unit 150 does not have to cause the output unit 160 to project the visual information. In the example of FIG. 6, the projection control unit 150 does not have to cause the animation A3 to be projected in a case where the size of the first object recognized by the recognition unit 120 is smaller than the predetermined range. The function makes it possible to perform more accurate projection control.

The above has described the case where the first object is not correctly recognized. Additionally, an action of a user on the second object may change, for example, the position of the second object in some situations. In the situation, the projection control unit 150 controls a projection of the visual information onto the projection surface on the basis of the position of the first object.

Figure 7:
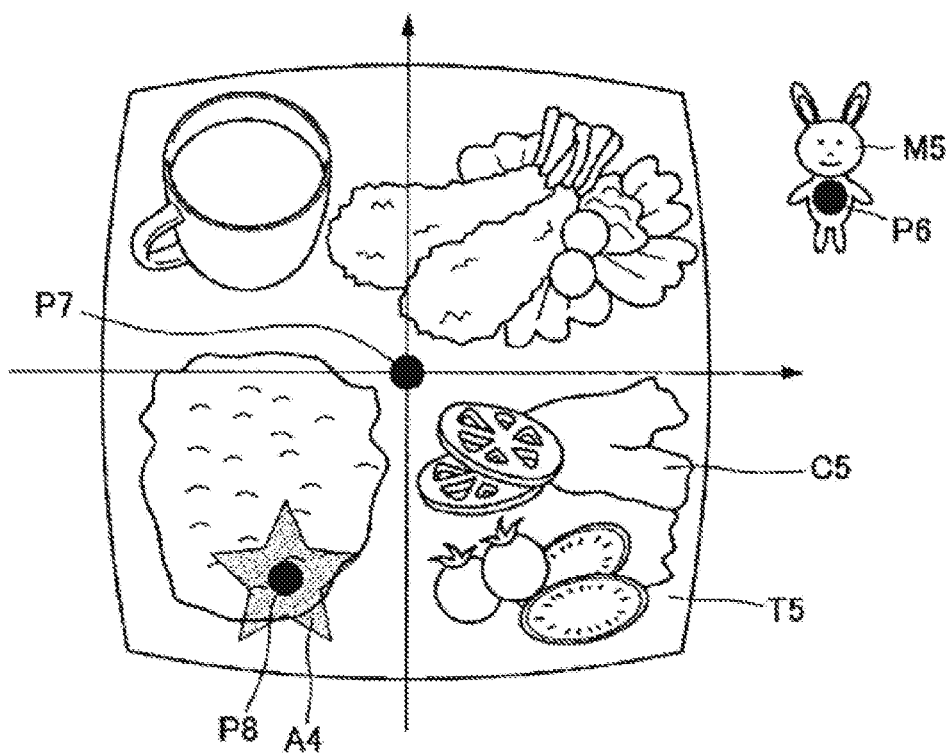
FIG. 7 is a diagram for describing an example of projection control performed by the projection control unit 150 according to the embodiment over the visual information on the basis of a position of the first object.

FIG. 7 is a diagram for describing an example of control performed by the projection control unit 150 over a projection of the visual information on the basis of the position of the first object. FIG. 5 illustrates a plate T5, food C5, a decoration M5, and an animation A4.

In a case where the position of the second object recognized by the recognition unit 120 is not included in the predetermined range, the projection control unit 150 controls the output unit 160 to cause the output unit 160 to project the visual information corresponding to the content onto the projection surface on the basis of the position of the first object. Here, the identification unit 130 identifies the content corresponding to the second object recognized by the recognition unit 120. Specifically, the projection control unit 150 determines a position for causing the visual information to be projected on the basis of the central position of the first object. The projection control unit 150 controls the output unit 160 to cause the output unit 160 to make a projection at the determined position.

In the example of FIG. 7, the projection control unit 150 determines a projection position P8 of the animation A4 on the basis of a position P7 of the plate T5. Here, the projection position P8 may be determined, for example, in a two-dimensional coordinate system in which the up direction in an image inputted to the input unit 110 serves as the Y axis direction with the position P7 of the plate T5 as the origin.

Even in a case where the second object is recognized at a position that is not included in the predetermined range, it is possible to project the visual information on the basis of the position of the first object in this way. The function makes it possible to project visual information even in a situation in which a user moves the second object.

Meanwhile, in a case where the recognition unit 120 is not able to recognize the second object, the projection control unit 150 does not have to cause the visual information to be projected. The function makes it possible to identify the content and project the visual information more accurately. Meanwhile, in a case where the recognition unit 120 is not able to recognize the second object, the identification unit 130 may also identify the content on the basis of the size of the first object.

The above has described the determination of the projection position of visual information by the projection control unit 150. Next, projection control is described that is performed by the projection control unit 150 in a case where the recognition unit 120 recognizes another object.

Figure 8:
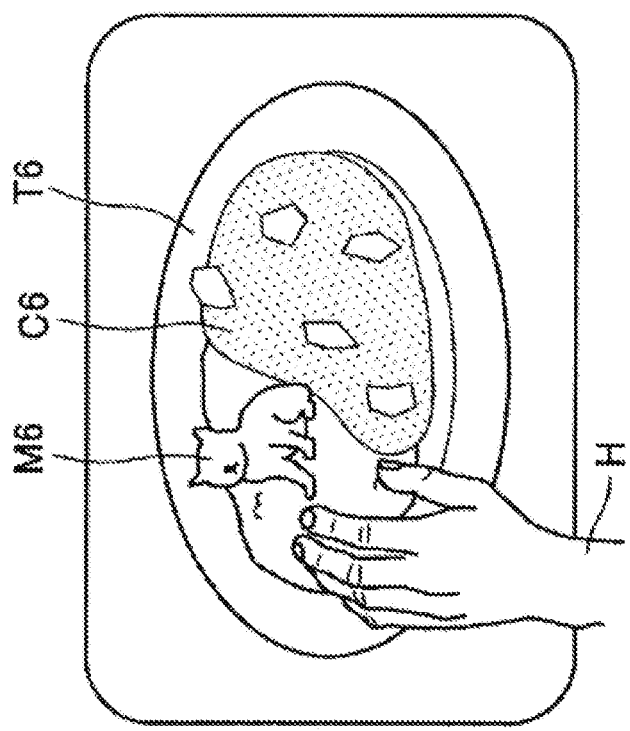
FIG. 8 is a diagram for describing an example of projection control performed by the projection control unit 150 according to the embodiment in a case where another object is recognized.
Figure 8:
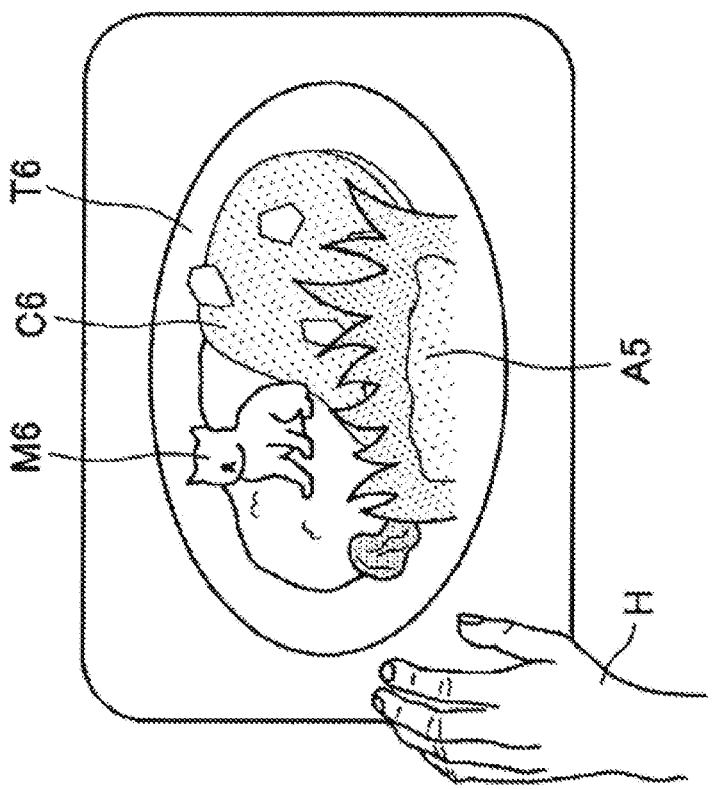
Figure 9:
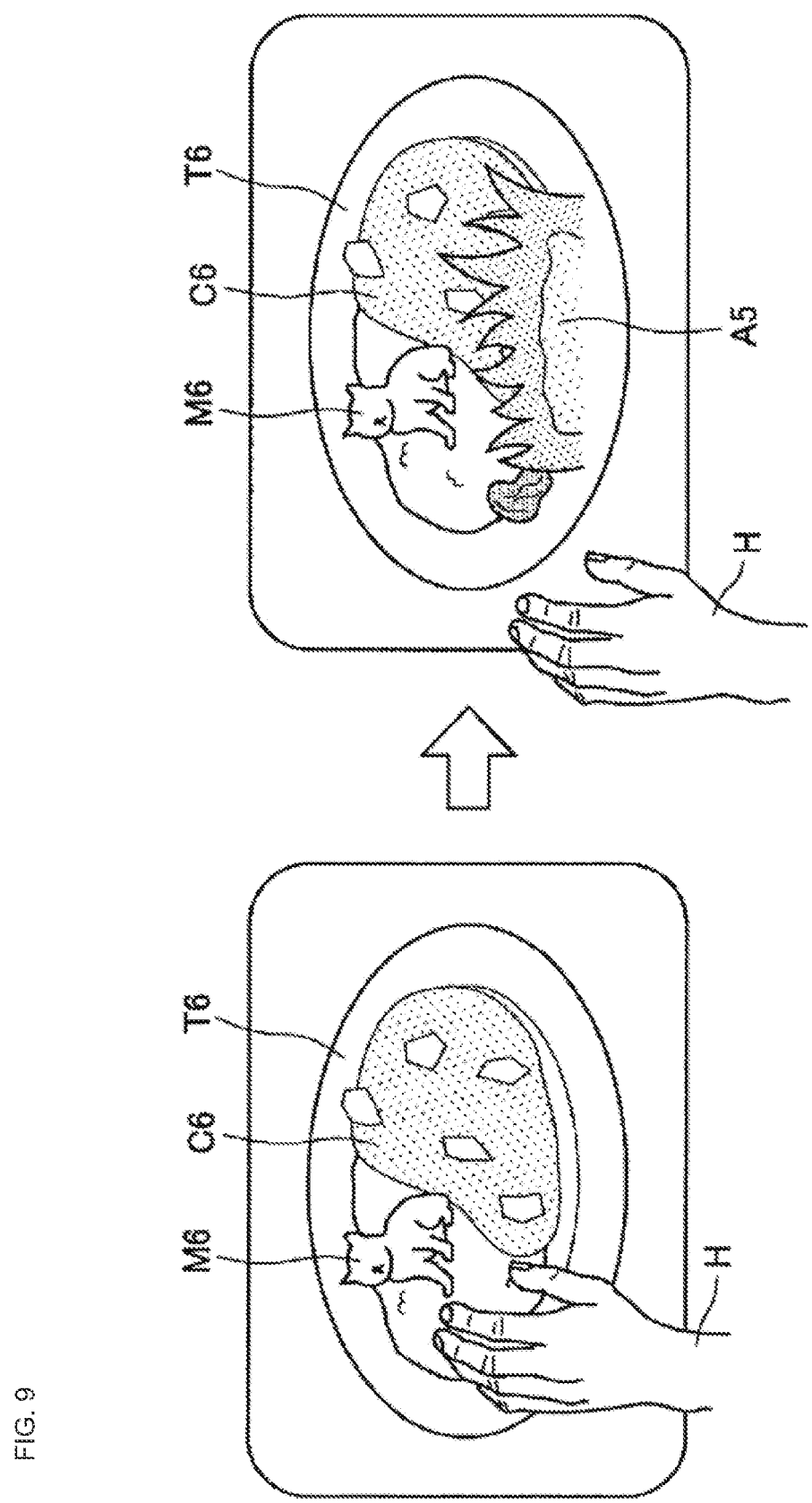
FIG. 9 is a diagram for describing an example of the projection control performed by the projection control unit 150 according to the embodiment in a case where the other object is recognized.

The projection control unit 150 may cause visual information to be projected onto the projection surface on the basis of a recognition result obtained by the recognition unit 120 recognizing another object. Each of FIGS. 8 and 9 is a diagram for describing an example of projection control performed by the projection control unit 150 in a case where another object is recognized. Each of FIGS. 8 and 9 illustrates a plate T6, food C6, and a decoration M6. It is to be noted that the other object here refers to an object that may come into contact with or come closer to the first object or the like on the table. Examples of the other object include a hand of a user, a hand of a waiter, a fork, and the like.

The projection control unit 150 may control a projection of the visual information on the basis of a recognition result of the other object. For example, in a case where the other object comes closer to or comes into contact with the content or the like, the projection control unit 150 may cause a projection of the visual information to be stopped. In addition, in a case where the other object goes away from the content or the like, the projection control unit 150 may cause a projection of the visual information to be resumed. Here, the projection control unit 150 may cause a projection of the visual information to be resumed any number of times. Alternatively, the projection control unit 150 may cause a projection of the visual information to be resumed a limited number of times. In addition, in a case where the visual information is the animation A, the projection control unit 150 may cause the animation A to be reproduced again from the beginning when a projection of the animation A is resumed. Alternatively, the projection control unit 150 may cause a projection to be resumed from the state in which a projection of the animation A is stopped.

In the left part of FIG. 8, the projection control unit 150 causes the output unit 160 to project an animation A5 on the basis of a recognition result of the plate T6 and a recognition result of the decoration M6. Here, in a case where a hand H of a user serving as the other object comes closer to the plate T6 and the food C6, the projection control unit 150 controls the output unit 160 to cause the output unit 160 to stop a projection of the animation A5. It is to be noted that the recognition unit 120 may recognize that the hand H of the user comes closer to or comes into contact with the food C6 on the basis of depth information acquired by the depth sensor included in the input unit 110.

In FIG. 9, in a case where the hand H of a user serving as the other object goes away from the plate T6 and the food C6, the projection control unit 150 controls the output unit 160 to cause the output unit 160 to resume a projection of an animation A6. In the right part of FIG. 9, the projection control unit 150 causes the output unit 160 to project the animation A5 on the basis of a recognition result of the plate T6 and a recognition result of the decoration M6.

The projection control unit 150 is able to control a projection of the visual information on the basis of a recognition result of the other object in this way. The function makes it possible to cause a user to intuitively reproduce and stop visual information and refrain from disturbing a user.

The above has described the projection control performed in a case where a single piece of content is provided. Next, projection control is described that is performed by the projection control unit 150 in a case where a plurality of pieces of content is provided.

Figure 10:
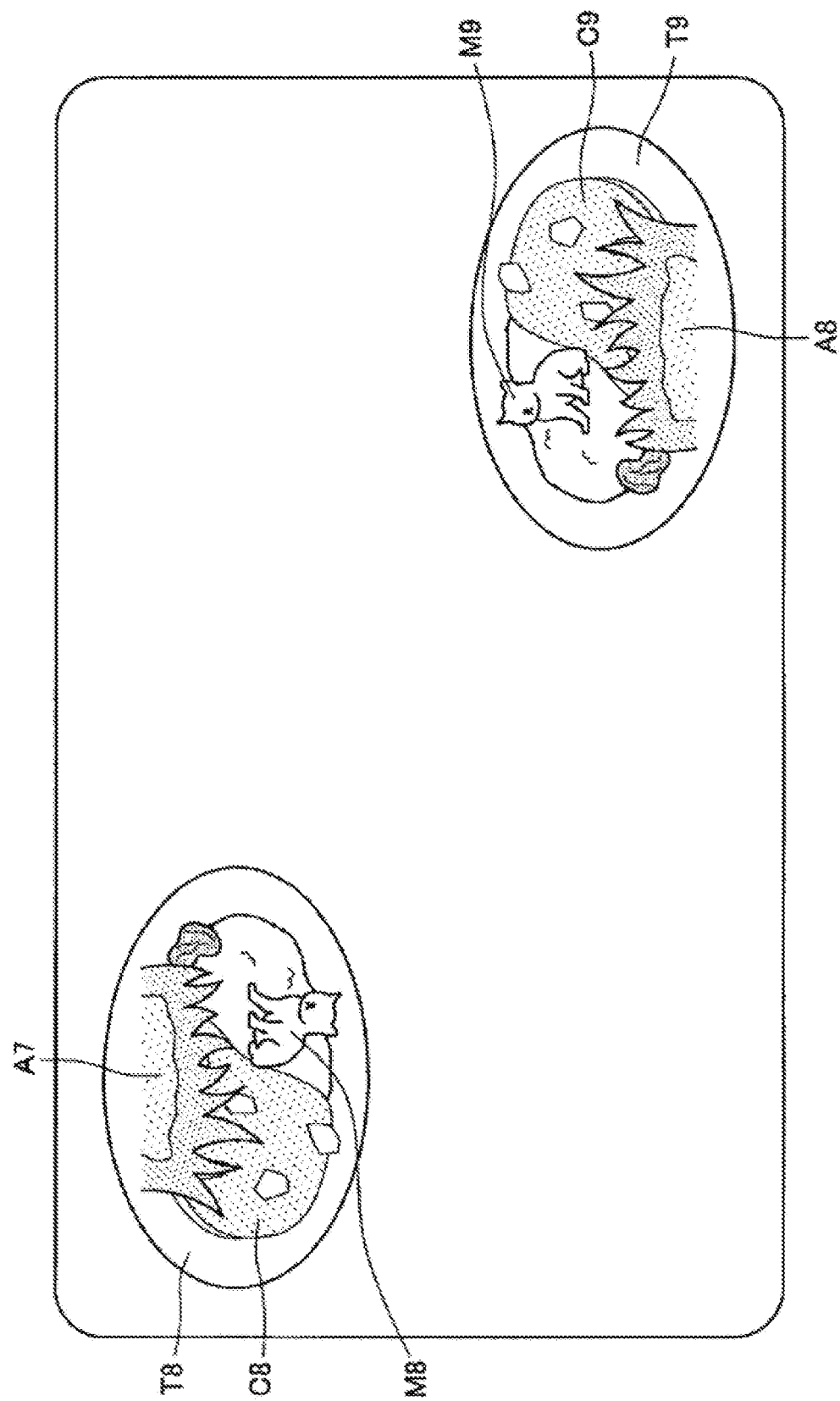
FIG. 10 is a diagram for describing an example of a case where a plurality of pieces of content according to the embodiment is provided.

In a case where the identification unit 130 identifies a plurality of pieces of content, the projection control unit 150 may cause the output unit 160 to output visual information associated with each of the pieces of content. FIG. 10 is a diagram for describing an example of a case where a plurality of pieces of content is provided. FIG. 10 illustrates a plate T8, food C8, and a decoration M8. In addition, FIG. 10 also illustrates a plate T9, food C9, and a decoration M9. In the example of FIG. 10, the projection control unit 150 projects an animation A7 and an animation A8 onto the projection surface. The animation A7 is associated with the food C8. The animation A8 associated with the food C9.

In addition, in a case where the identification unit 130 identifies a plurality of pieces of content, the projection control unit 150 may cause the output unit 160 to output the visual information corresponding to the plurality of pieces of content. Specifically, the projection control unit 150 may cause the output unit 160 to project visual information corresponding to a combination of a plurality of pieces of content. The visual information is different from the respective pieces of visual information projected in a case where the identification unit 130 identifies the plurality of pieces of content.

Figure 11:
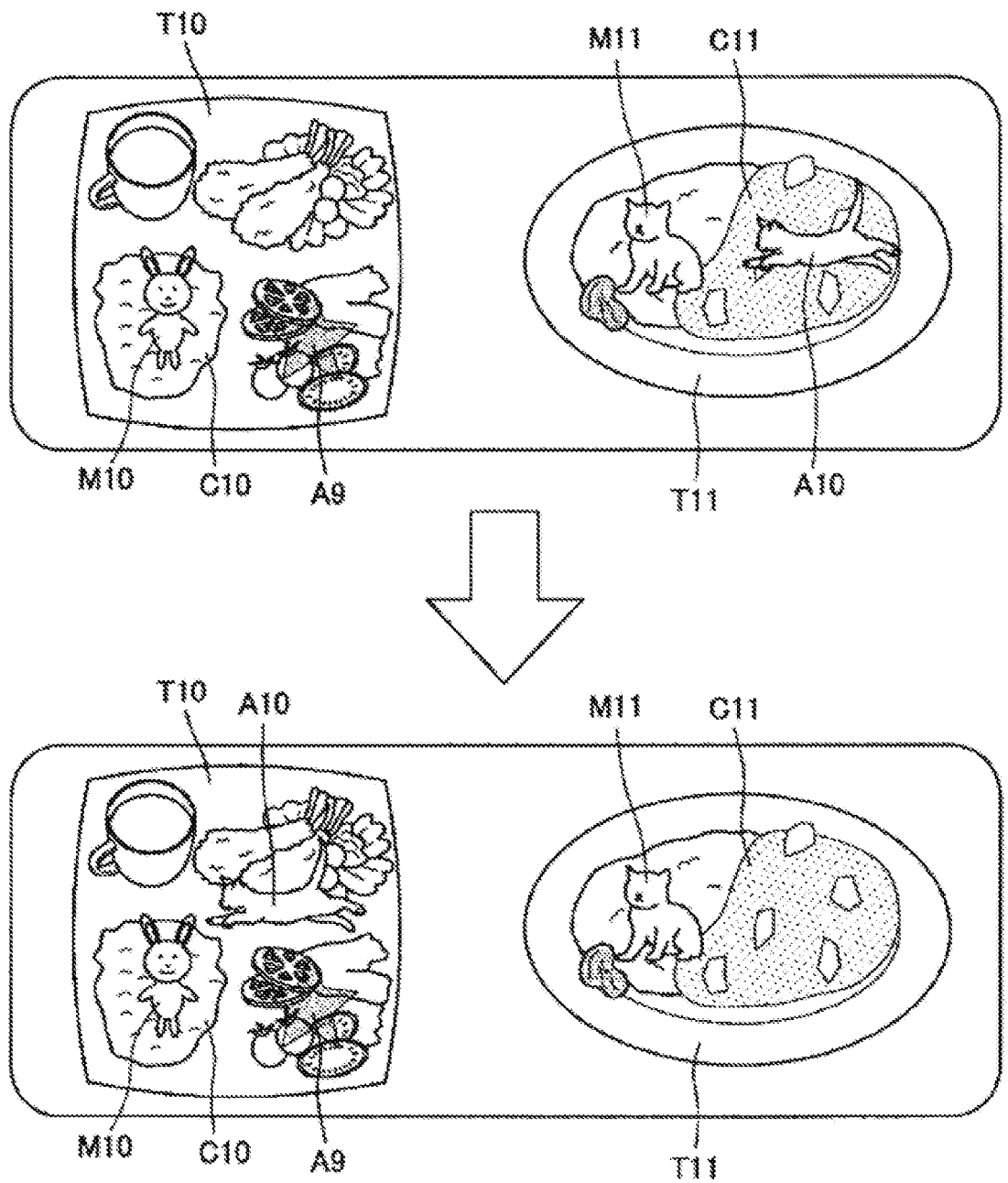
FIG. 11 is a diagram for describing an example of projection control performed by the projection control unit 150 according to the embodiment in a case where a plurality of pieces of content is identified.

FIG. 11 is a diagram for describing an example of projection control performed by the projection control unit 150 in a case where a plurality of pieces of content is identified. FIG. 11 illustrates a plate T10, food C10, a decoration M10, a plate T11, food C11, and a decoration M11.

In the example of the upper part of FIG. 11, the projection control unit 150 causes an animation A9 to be projected on the basis of recognition results of the plate T10 and the decoration M10. In addition, the projection control unit 150 causes an animation A10 to be projected on the basis of recognition results of the plate T11 and the decoration M11. Here, the animation A10 is visual information associated with the combination of the food C10 and the food C11.

Here, for example, the projection control unit 150 may cause visual information associated with a combination of a plurality of pieces of content to be projected onto the plurality of pieces of content. In the example of FIG. 11, the projection control unit 150 moves the animation A10 from the plate T11, the decoration M11, and the food C11 to the plate T10 and the food C10.

The projection control unit 150 is able to cause visual information to move from a certain piece of content to another pieces of content on the basis of recognition results of a plurality of pieces of content in this way. The function allows a user to enjoy a projection of visual information more.

Figure 12:
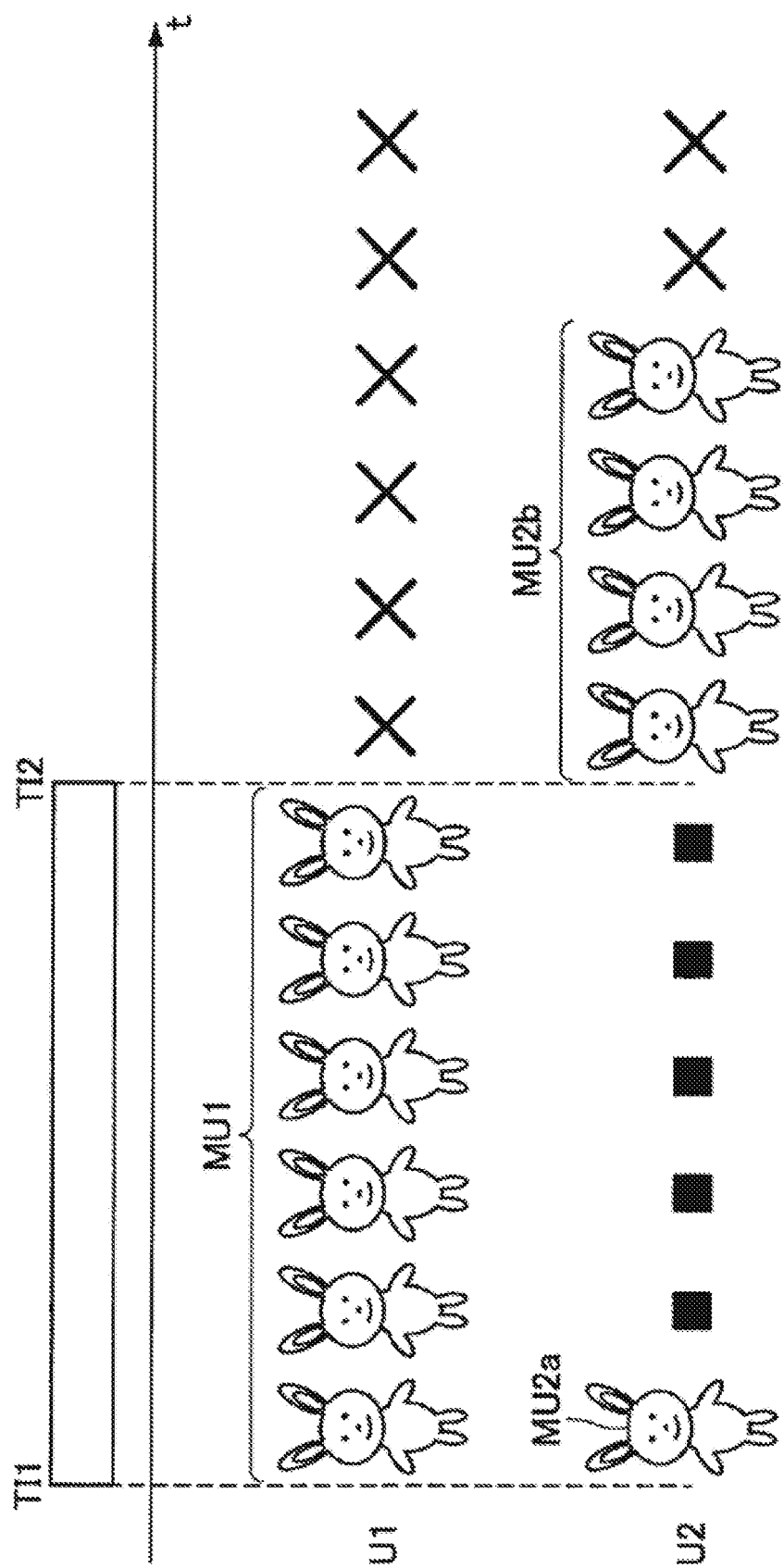
FIG. 12 is a diagram for describing an example of projection control based on time elapsed since the content according to the embodiment is provided.

Next, projection control is described that is performed by the projection control unit 150 on the basis of elapsed time. FIG. 12 is a diagram for describing an example of projection control based on time elapsed since the content is provided. FIG. 12 illustrates, in chronological order, the number of times visual information is projected after a user U1 and a user U2 are each provided with content.

The projection control unit 150 may control a projection of the visual information on the basis of elapsed time. Specifically, the projection control unit 150 may determine whether or not to cause visual information to be projected, for example, on the basis of time elapsed since pieces of content are provided. For example, the projection control unit 150 may determine whether or not to cause the output unit 160 to project visual information onto the projection surface on the basis of time elapsed since a projection of visual information is first started.

The projection control unit 150 may cause the output unit 160 to project visual information, for example, before a predetermined time has elapsed since content is provided. The projection control unit 150 may cause the output unit 160 to refrain from projecting visual information after the predetermined time elapses. Meanwhile, the projection control unit 150 may cause the output unit 160 to project visual information even after a predetermined time has elapsed since content is provided, for example, in a case where visual information is projected a predetermined number of times or less before the predetermined time elapses.

The following describes an example of FIG. 12. Here, the predetermined number of times for projections set by the projection control unit 150 is five. The projection control unit 150 causes the output unit 160 to make projections MU1 of visual information during the period from time TI1 to predetermined time TI2. At the time TI1, content is provided. Here, the number of times for the projections MU1 of visual information is six. Meanwhile, the projection control unit 150 causes the output unit 160 to refrain from projecting visual information at or after the predetermined time TI2.

In addition, the user U2 causes projections MU2a of the visual information to be made during the period from the time TI1 to the predetermined time TI2. At the time TI1, the content is provided. Here, the number of times for the projections MU2 of visual information is one. This is less than five or the predetermined number of times for projections. The projection control unit 150 thus causes projections MU2b of visual information to be made even at or after the predetermined time TI2. Here, the projection control unit 150 does not have to cause visual information to be projected when the total number of times for the projections MU2a of visual information and the projections MU2b of visual information reaches the predetermined number of times for projections.

It is possible to control a projection of visual information on the basis of elapsed time in this way. The function makes it possible to prevent a user from getting bored even in a case where the same visual information is projected.

Figure 13:
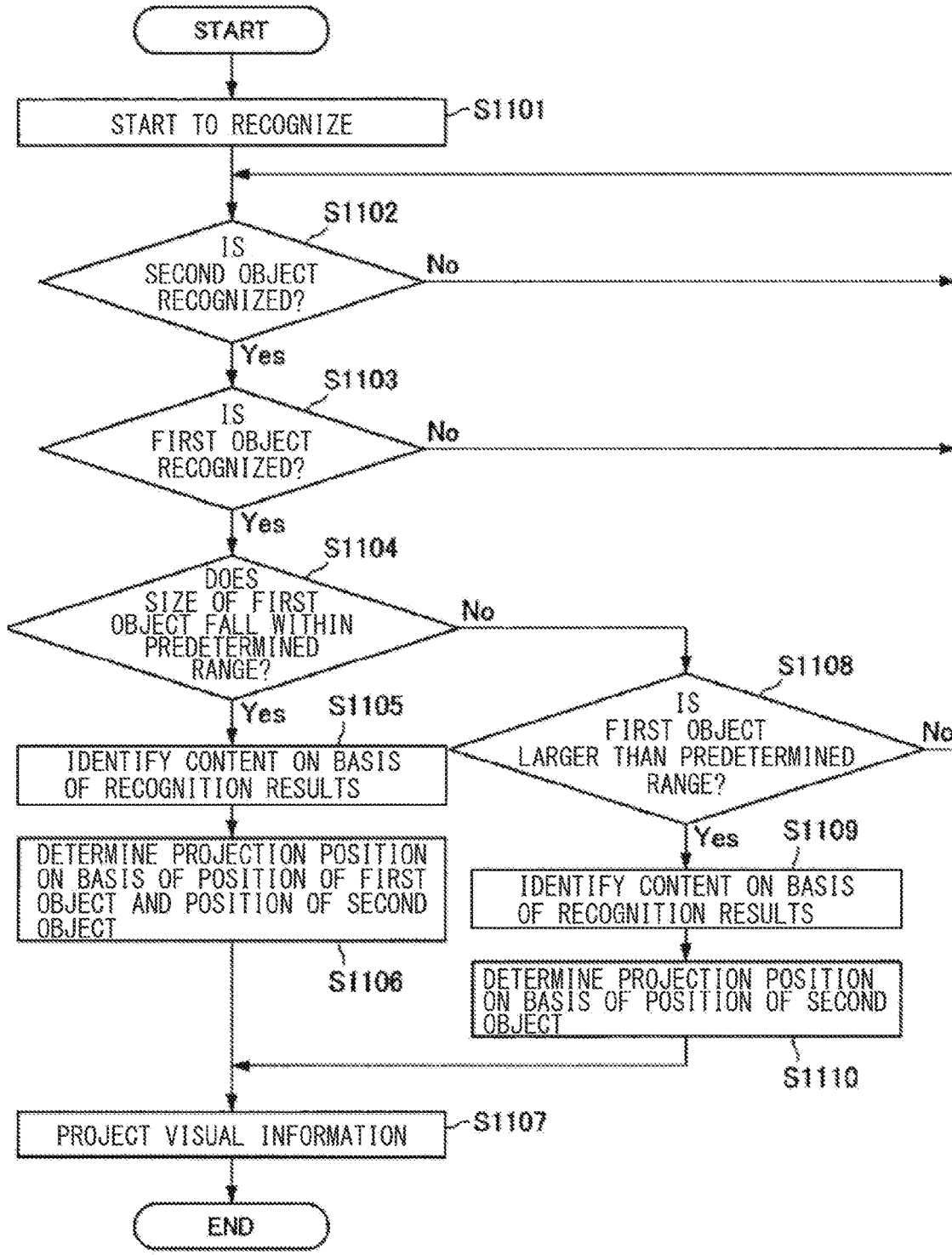
FIG. 13 is a diagram for describing an example of a flow of projection control according to the embodiment.

Next, a flow of projection control according to the present embodiment is described. FIG. 13 is a diagram for describing an example of a flow of projection control according to the present embodiment. With reference to FIG. 13, first, the recognition unit 120 starts to recognize the second object on the basis of information such as an image captured and acquired by the input unit 110 (S1101). Next, the recognition unit 120 determines whether or not the second object is recognized (S1102). In a case where the recognition unit 120 determines that the second object is not recognized (S1102: NO), the process returns to the step S1102. In contrast, in a case where the recognition unit 120 determines that the second object is recognized (S1102: YES), the recognition unit 120 determines whether or not the first object is recognized on the basis of information such as an image captured and acquired by the input unit 110 (S1103). In a case where the recognition unit 120 determines that the first object is not recognized (S1103: NO), the process returns to the step S1102.

Next, the identification unit 130 determines whether or not the size of the first object falls within a specific range (S1104). In a case where the identification unit 130 determines that the size of the first object falls within the specific range (S1104: YES), the identification unit 130 identifies the content on the basis of recognition results of the first object and the second object (S1105). Next, the projection control unit 150 determines a projection position on the basis of the position of the first object and the position of the second object (S1106). Next, the projection apparatus 10 controls the output unit 160 to cause the output unit 160 to project the visual information corresponding to the content onto the projection surface (S1107) and the projection apparatus 10 finishes the operation.

In contrast, in a case where the identification unit 130 determines that the size of the first object exceeds the specific range (S1104: NO), the identification unit 130 determines whether or not the size of the first object is greater than a predetermined range (S1108). In a case where it is determined that the size of the first object is not greater than the predetermined range (S1108: NO), the process returns to the step S1102. In contrast, in a case where the identification unit 130 determines that the size of the first object is greater than the predetermined range (S1108: YES), the identification unit 130 identifies the content on the basis of a recognition result of the second object (S1109). Next, the projection control unit 150 determines a projection position on the basis of the position of the second object (S1110). Next, the projection control unit 150 controls the output unit 160 to cause the output unit 160 to project the visual information corresponding to the content onto the projection surface (S1107) and the projection apparatus 10 finishes the operation.

As described above, the projection control unit 150 is able to project visual information at an accurate position on the basis of recognition results of the first object and the second object even in a case where the first object or the second object has a positional relationship other than the positional relationship defined in advance. In addition to the first object and the second object, the state of the content itself may, however, change in some situations, for example, like food is eaten by a user.

The projection control unit 150 according to the present embodiment may therefore perform projection control on the basis of a state change in the content. For example, the projection control unit 150 may determine a position for projecting the animation A on the basis that the recognition unit 120 recognizes a mass change in the food C dished up on the plate T in a scene of a meal.

Figure 14:
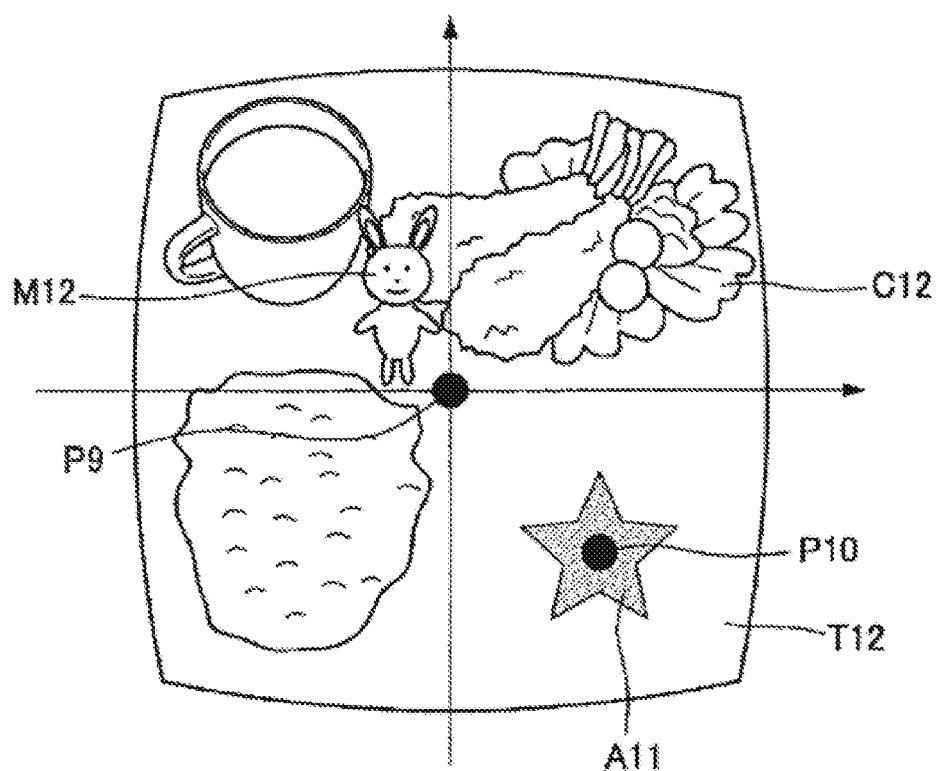
FIG. 14 is a diagram for describing an example of projection control based on the state change in the content according to the embodiment.

FIG. 14 is a diagram for describing an example of projection control based on a state change in the content. FIG. 14 illustrates a plate T12, food C12, and a decoration M12. Here, the lower right portion of the plate T12 is a blank region in which the food C12 does not exist.

The projection control unit 150 may cause the visual information corresponding to the content identified by the identification unit 130 to be projected onto the first object. Specifically, the projection control unit 150 may select a region as allowing the visual information to be directly projected onto the first object. The projection control unit 150 may cause the output unit 160 to project the visual information onto the region. For example, in a case where the recognition unit 120 recognizes the region of a new first object on the projection surface, the projection control unit 150 may cause the output unit 160 to project the visual information onto the region.

In the example of FIG. 14, the projection control unit 150 causes the output unit 160 to project an animation A11 at a projection position P10 in a blank region in the lower right portion of the plate T12 on the basis that the recognition unit 120 recognizes the blank region.

It is to be noted that the recognition unit 120 may recognize a state change in the content from an image captured and acquired by the input unit 110. In addition, the recognition unit 120 may recognize a mass change in the content by estimating the volume of the content from the image.

It is possible to control a projection of visual information on the basis of a state change in the content in this way. The function makes it possible to flexibly project visual information in accordance with an action of a user on the content.

It is to be noted that, in a case where the recognition unit 120 recognizes that the volume of the content decreases, the projection control unit 150 may determine a position for projecting visual information on the basis that the volume of the content decreases in addition to a recognition result of the first object and a recognition result of the second object.

Figure 15:
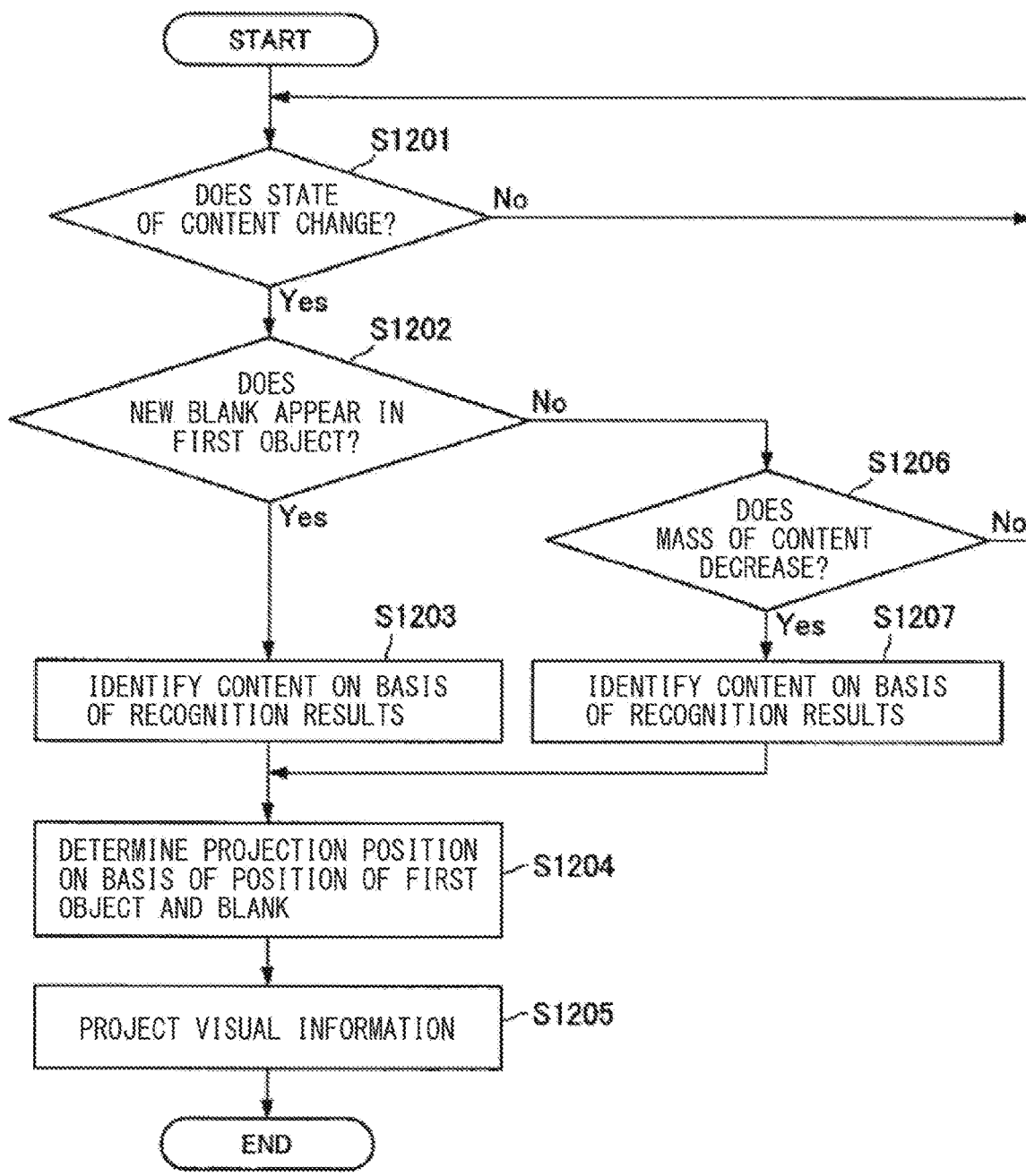
FIG. 15 is a diagram for describing an example of a flow of projection control during the state change in the content according to according to the embodiment.

Next, an example of a flow of projection control during a state change in the content according to the present embodiment is described. FIG. 15 is a diagram for describing the example of the flow of the projection control during a state change in the content according to the present embodiment. FIG. 15 presupposes a situation in which content is provided and the recognition unit 120 is performing recognition. With reference to FIG. 15, first, the recognition unit 120 determines whether or not the state of the content changes (S1201). In a case where it is determined that the state of the content does not change (S1201: NO), the process returns to step S1201. In a case where it is determined that the state of the content changes (S1201: YES), the recognition unit 120 determines whether or not a new blank region appears in the first object on the projection surface (S1202). In a case where it is determined that a blank region appears in the first object (S1202: YES), the content is identified on the basis of recognition results of the first object and the second object (S1203). Next, the projection control unit 150 determines a projection position on the basis of the position of the first object and the blank region (S1204). Next, the projection control unit 150 controls the output unit 160 to cause the output unit 160 to project the visual information corresponding to the content onto the projection surface (S1205) and the projection apparatus 10 finishes the operation.

In contrast, in a case where it is determined that no blank region appears in the first object (S1202: NO), the recognition unit 120 determines whether or not the mass of the content changes (S1206). In a case where it is determined that the mass of the content does not change (S1206: NO), the process returns to step S1201. In contrast, in a case where it is determined that the mass of the content changes (S1204: YES), the content is identified on the basis of a recognition result of the first object, a recognition result of the second object, and a recognition result of the content that decreases in mass (S1207). Next, the projection control unit 150 determines a projection position on the basis of the position of the first object and the currently existing blank region (S1204). Next, the projection control unit 150 controls the output unit 160 to cause the output unit 160 to project the visual information corresponding to the content onto the projection surface (S1205) and the projection apparatus 10 finishes the operation.

The above is merely an example. A way to combine the conditions regarding a state change is not limited to this.

The above has described the example in which the content is food. However, even in a case where the content is not food, projection control by the projection control unit 150 is applicable.

Figure 16:
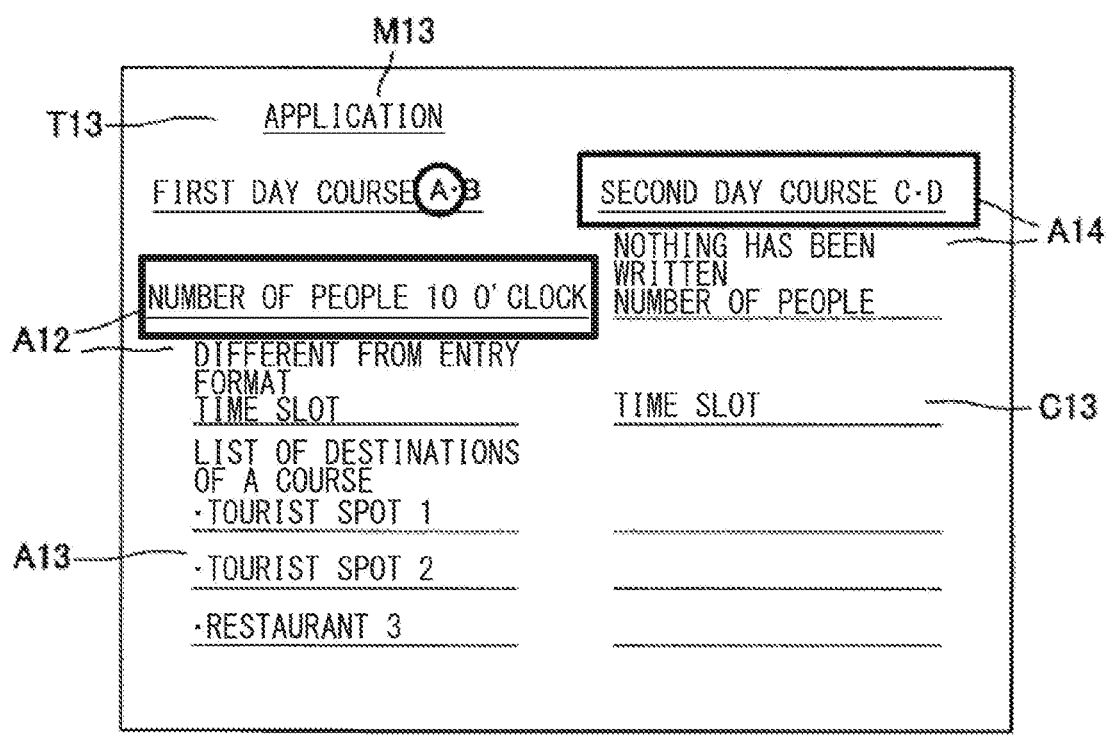
FIG. 16 is a diagram for describing an example of projection control to fill in a sheet according to the embodiment.

For example, FIG. 16 is a diagram for describing an example of projection control to fill in a sheet. FIG. 16 illustrates an application sheet T13 serving as the first object, a title M13 serving as the second object, a form C13 serving as the content, and pieces of guide information A12, A13, and A14 each serving as the visual information corresponding to the form C13.

The projection control unit 150 causes the output unit 160 to project the pieces of guide information A12 and A13 onto the application sheet T13 on the basis of a change in the item status of the form C13 recognized by the recognition unit 120. Here, the change in the item status of the form C13 means, for example, that a user fills in the application sheet T13 in conformity with the format of the form C13. On the basis that information is written in conformity with the format in the form C13 recognized by the recognition unit 120, the projection control unit 150 causes the output unit 160 to project the visual information corresponding to the written information.

Meanwhile, the change in the item status of the form C13 may also include writing information without conforming to the format of the form C13, writing wrong information, and the like. For example, on the basis that information is written in the form C13 recognized by the recognition unit 120 without conforming to the format, the projection control unit 150 may cause the output unit 160 to project visual information as notifying (guiding) a user that the written information does not conform to the format. In addition, on the basis that the recognition unit 120 recognizes content or a portion of content which has not yet been filled in, the projection control unit 150 may cause the output unit 160 to project visual information as notifying a user that the content that has not yet been filled in exists.

In the example of FIG. 16, the projection control unit 150 causes the output unit 160 to project the guide information A12 onto the application sheet T13. The guide information A12 informs a user that information is written in a format different from the entry format. In addition, the projection control unit 150 concurrently causes the guide information A13 to be projected onto the application sheet T13 on the basis that the recognition unit 120 recognizes information written in the item of the form C13 to select "A course". The guide information A13 indicates the details of selected "A course". In addition, the projection control unit 150 concurrently causes the output unit 160 to project the guide information A14 on the basis that the recognition unit 120 recognizes an entry field that has not yet been filled in since an application sheet is provided. The guide information A14 asks a user to write information.

It is to be noted that the recognition unit 120 may recognize a sheet serving as the first object by using, for example, size, color, or shape. In addition, the recognition unit 120 may recognize the title serving as the second object by using, for example, a predetermined pattern or printed character.

The projection control unit 150 is able to recognize information written in an item on the sheet and appropriately determine guide information to be projected in this way. The function makes it possible to increase the convenience for a user to fill in a sheet. It is to be noted that projection control by the projection control unit 150 is not limited to the example described above, but applicable in a variety of situations.

2. Hardware Configuration Example

Figure 17:
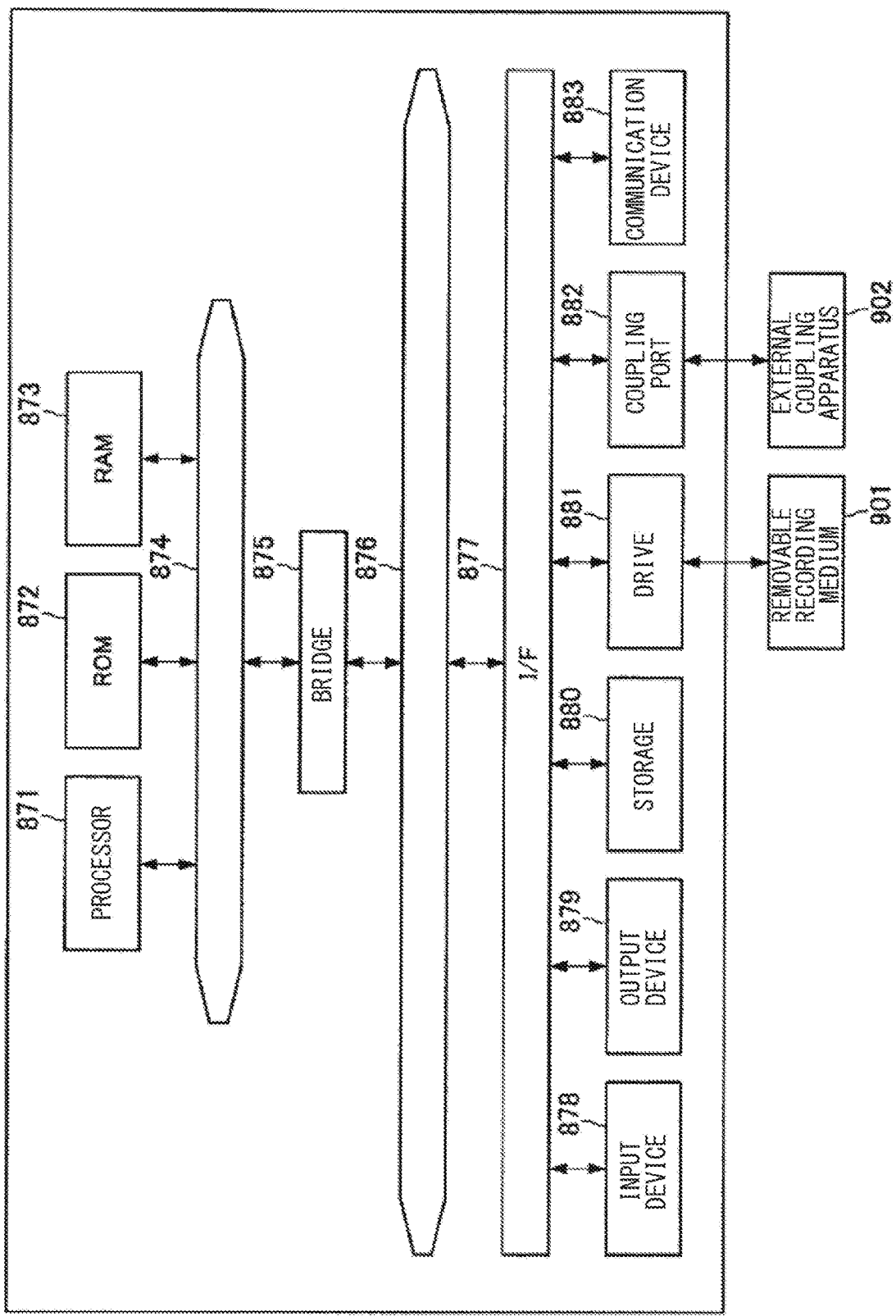
FIG. 17 is a block diagram illustrating a hardware configuration example of the projection apparatus 10 according to an embodiment of the present disclosure.

Next, a hardware configuration example of the projection apparatus 10 according to the embodiment of the present disclosure is described. FIG. 17 is a block diagram illustrating a hardware configuration example of the projection apparatus 10 according to the embodiment of the present disclosure. With reference to FIG. 17, the projection apparatus 10 includes, for example, a processor 871, ROM 872, RAM 873, a host bus 874, a bridge 875, an external bus 876, an interface 877, an input device 878, an output device 879, a storage 880, a drive 881, a coupling port 882, and a communication device 883. It is to be noted that the hardware configuration illustrated here is an example and a portion of the components may be omitted. In addition, a component other than the components illustrated here may be further included.

(Processor 871)

The processor 871 functions, for example, as an arithmetic processing device or a control device. The processor 871 controls all or a portion of the operations of the respective components on the basis of a variety of programs recorded in the ROM 872, the RAM 873, the storage 880, or a removable recording medium 901.

(ROM 872 and RAM 873)

The ROM 872 is means for storing a program to be read by the processor 871, data for use in calculation, and the like. The RAM 873 temporarily or permanently stores, for example, a program to be read by the processor 871, a variety of parameters to be varied if necessary in executing the program, and the like.

(Host Bus 874, Bridge 875, External Bus 876, and Interface 877)

The processor 871, the ROM 872, and the RAM 873 are coupled to each other, for example, via the host bus 874 that allows for high-speed data transmission. Meanwhile, the host bus 874 is coupled to the external bus 876 having a relatively low data transmission rate, for example, via the bridge 875. In addition, the external bus 876 is coupled to a variety of components via the interface 877.

(Input Device 878)

For example, a mouse, a keyboard, a touch panel, a button, a switch, a lever, and the like are used for the input device 878. Further, as the input device 878, a remote controller (referred to as remote control below) is sometimes used that is able to transmit a control signal by using infrared rays or other radio waves. In addition, the input device 878 includes a sound input device such as a microphone.

(Output Device 879)

The output device 879 is a device that is able to visually or aurally notify a user of acquired information. Examples of the device include a display device such as CRT (Cathode Ray Tube), LCD, or organic EL, an audio output device such as a speaker or a headphone, a printer, a mobile phone, a facsimile, or the like. In addition, the output device 879 according to the present disclosure includes a variety of vibration devices that are able to output tactile stimulation.

(Storage 880)

The storage 880 is a device for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads out information recorded in the removable recording medium 901 such as a magnetic disk, an optical disc, a magneto-optical disk, or a semiconductor memory or writes information in the removable recording medium 901.

(Removable Recording Medium 901)

The removable recording medium 901 includes, for example, a DVD medium, a Blu-ray (registered trademark) medium, an HD DVD medium, a variety of semiconductor storage media, and the like. Needless to say, the removable recording medium 901 may be, for example, an IC card, an electronic device, or the like each of which is mounted with a contactless IC chip.

(Coupling Port 882)

The coupling port 882 is, for example, a port such as a USB (Universal Serial Bus) port, an IEEE 1394 port, SCSI (Small Computer System Interface), an RS-232C port, or an optical audio terminal for coupling an external coupling apparatus 902.

(External Coupling Apparatus 902)

The external coupling apparatus 902 is, for example, a printer, a portable music player, a digital camera, a digital video camera, an IC recorder, or the like.

(Communication Device 883)

The communication device 883 is a communication device for coupling to a network. The communication device 883 is, for example, a communication card for wired or wireless LAN, Bluetooth (registered trademark), or WUSB (Wireless USB), a router for optical communication, a router for ADSL (Asymmetric Digital Subscriber Line), a modem for various kinds of communication, or the like.

3. Conclusion

As described above, the projection apparatus 10 according to the embodiment of the present disclosure is able to project visual information more accurately by using a recognition result of the first object and a recognition result of the second object. In addition, the projection apparatus 10 recognizes a state change in the content, thereby making it possible to project visual information corresponding to the state change.

The preferred embodiment of the present disclosure has/have been described above in detail with reference to the accompanying drawings, but the technical scope of the present disclosure is not limited to the example. A person skilled in the art may find various alterations and modifications within the scope of the appended claims, and it should be understood that they will naturally come under the technical scope of the present disclosure.

In addition, the effects described herein are merely illustrative and exemplary, but not limitative. In other words, the technology according to the present disclosure may exert other effects that are apparent to those skilled in the art from the description herein in addition to the above-described effects or in place of the above-described effects.

It is to be noted that the following configurations also fall within the technical scope of the present disclosure.

(1)

An information processing apparatus including
a projection control unit that causes visual information to be projected onto a projection surface, the visual information corresponding to content that is provided to the projection surface and disposed on a first object, the content being identified on the basis of a recognition result of the first object and a recognition result of a second object, the second object being provided along with the first object.

(2)

The information processing apparatus according to (1), in which the second object is associated with each of pieces of the content.

(3)

The information processing apparatus according to (1) or (2), in which
the first object and the second object are continuously recognized, and
the projection control unit causes the visual information to be dynamically projected onto the projection surface on the basis of the recognition result of the first object and the recognition result of the second object.

(4)

The information processing apparatus according to any one of (1) to (3), in which
the recognition result of the first object includes size of the first object, and
the projection control unit causes the visual information corresponding to the content to be projected onto the projection surface in accordance with the size of the first object.

(5)

The information processing apparatus according to (4), in which the projection control unit causes the visual information corresponding the content to be projected onto the projection surface in a case where the size of the first object is not included in a predetermined range, the content being identified on the basis of the recognition result of the second object.

(6)

The information processing apparatus according to any one of (1) to (5), in which
the recognition results include a position of the first object and a position of the second object, and
the projection control unit causes the visual information corresponding to the content to be projected onto the projection surface on the basis of the position of the first object and the position of the second object.

(7)

The information processing apparatus according to (6), in which the projection control unit causes the visual information corresponding to the content to be projected onto the projection surface on the basis of the position of the first object in a case where the position of the second object is not included in a predetermined range, the position of the second object being based on the position of the first object.

(8)

The information processing apparatus according to any one of (1) to (7), further including a recognition unit that recognizes the first object and the second object, in which
the projection control unit causes the visual information corresponding to the identified content to be projected onto the projection surface on the basis of the recognition result of the first object and the recognition result of the second object by the recognition unit.

(9)

The information processing apparatus according to (8), in which
the recognition unit recognizes a state change in the content, and the projection control unit causes the visual information to be projected onto the projection surface in accordance with the state change.

(10)

The information processing apparatus according to (9), in which the state change includes a mass change in the content, and the projection control unit causes the visual information corresponding to the mass change to be projected onto the projection surface.

(11)

The information processing apparatus according to any one of (1) to (10), in which the visual information is associated with each of pieces of the content.

(12)

The information processing apparatus according to any one of (1) to (11), in which the projection control unit causes the visual information to be projected onto the first object.

(13)

The information processing apparatus according to any one of (1) to (12), in which the projection control unit causes the visual information to be projected onto the projection surface on the basis of a recognition result of another object.

(14)

The information processing apparatus according to (13), in which the projection control unit causes the visual information to be projected onto the projection surface on the basis of an interaction of the other object with the first object or the second object, and the interaction includes the other object coming closer to or coming into contact with the first object or the second object.

(15)

The information processing apparatus according to any one of (1) to (14), in which the projection control unit causes the visual information to be projected onto the projection surface on the basis of time elapsed since a projection of the visual information corresponding to the identified content is started.

(16)

The information processing apparatus according to any one of (1) to (15), in which, in a case where a plurality of pieces of the content is identified, the projection control unit causes the visual information corresponding to the plurality of pieces of content to be projected onto the projection surface.

(17)

The information processing apparatus according to any one of (1) to (16), in which the content includes a food product, and the second object is provided along with the food product.

(18)

The information processing apparatus according to (17), in which the projection control unit causes a projection of the visual information onto the projection surface to be started at a timing at which the food product is provided.

(19)

An information processing method including causing, by a processor, visual information to be projected onto a projection surface, the visual information corresponding to content that is provided to the projection surface and disposed on a first object, the content being identified on the basis of a recognition result of the first object and a recognition result of a second object, the second object being provided along with the first object.

(20)

A computer-readable recording medium having a program recorded thereon, the program causing a computer to achieve a projection control function of causing visual information to be projected onto a projection surface, the visual information corresponding to content that is provided to the projection surface and disposed on a first object, the content being identified on the basis of a recognition result of the first object and a recognition result of a second object, the second object being provided along with the first object.

REFERENCE SIGNS LIST 10 projection apparatus
20 table
110 input unit
120 recognition unit
130 identification unit
140 storage unit
150 projection control unit
160 output unit

The invention claimed is:

1. An information processing apparatus, comprising:
a processor configured to:
recognize a size of a first object from an image, wherein
the first object is on a projection surface, and
the first object includes content;
recognize a second object from the image, wherein the second object is on the projection surface;
determine the recognized size of the first object is not in a first range;
identify, based on a result of the recognition of the second object and the determination that the recognized size of the first object is not in the first range, the content that is on the projection surface; and
control projection of visual information onto the projection surface based on the determination that the recognized size of the first object is not in the first range, wherein the visual information corresponds to the identified content that is on the projection surface.

2. The information processing apparatus according to claim 1, wherein the second object is associated with each piece of a plurality of pieces of the content.

3. The information processing apparatus according to claim 1, wherein the processor is further configured to:
continuously recognize the first object and the second object; and
dynamically control the projection of the visual information onto the projection surface based on the continuous recognition of the first object and the second object.

4. The information processing apparatus according to claim 1, wherein the processor is further configured to:
recognize a position of the first object and a position of the second object; and
control the projection of the visual information corresponding onto the projection surface based on the position of the first object and the position of the second object.

5. The information processing apparatus according to claim 4, wherein
the processor is further configured to control the projection of the visual information onto the projection surface based on the position of the first object in a case where the position of the second object is not in a second range, and
the position of the second object is based on the position of the first object.

6. The information processing apparatus according to claim 1, wherein the processor is further configured to:
recognize a state change in the content; and
control the projection of the visual information onto the projection surface based on the state change.

7. The information processing apparatus according to claim 6, wherein
the state change includes a mass change in the content, and
the processor is further configured to control the projection of the visual information corresponding to the mass change onto the projection surface.

8. The information processing apparatus according to claim 1, wherein the visual information is associated with each piece of a plurality of pieces of the content.

9. The information processing apparatus according to claim 1, wherein the processor is further configured to control the projection the visual information onto the first object.

10. The information processing apparatus according to claim 1, wherein the processor is further configured to:
recognize a third object; and
control the projection of the visual information onto the projection surface based on a recognition result of the third object.

11. The information processing apparatus according to claim 10, wherein
the processor is further configured to control the projection of the visual information onto the projection surface based on interaction of the third object with at least one of the first object or the second object, and
the interaction indicates that the third object one of comes closer to or comes into contact with the at least one of the first object or the second object.

12. The information processing apparatus according to claim 1, wherein the processor is further configured to control the projection of the visual information onto the projection surface based on a time elapsed since the projection of the visual information corresponding to the identified content is started.

13. The information processing apparatus according to claim 1, wherein the processor is further configured to:
identify a plurality of pieces of the content; and
control the projection of the visual information corresponding to the plurality of pieces of the content onto the projection surface.

14. The information processing apparatus according to claim 1, wherein
the content includes a food product, and
the second object is on the food product.

15. The information processing apparatus according to claim 14, wherein the processor is further configured to control the projection of the visual information onto the projection surface to be started at a timing of provision of the food product.

16. An information processing method, comprising:
recognizing, by a processor, a size of a first object from an image, wherein
the first object is on a projection surface, and
the first object includes content;
recognizing, by the processor, a second object from the image, wherein the second object is on the projection surface;
determining, by the processor, the recognized size of the first object is not in a specific range;
identifying, by the processor, the content that is on the projection surface, wherein the identification is based on a result of the recognition of the second object and the determination that the recognized size of the first object is not in the specific range; and
controlling, by the processor, projection of visual information onto the projection surface based on the determination that the recognized size of the first object is not in the specific range, wherein the visual information corresponds to the identified content that is on the projection surface.

17. A non-transitory computer-readable medium having stored thereon computer-executable instructions which, when executed by a computer, cause the computer to execute operations, the operations comprising:
recognizing a size of a first object from an image, wherein
the first object is on a projection surface, and
the first object includes content;
recognizing a second object from the image, wherein the second object is on the projection surface;
determining the recognized size of the first object is not in a specific range;
identifying, based on a result of the recognition of the second object and the determination that the recognized size of the first object is not in the specific range, the content that is on the projection surface; and
controlling projection of visual information onto the projection surface based on the determination that the recognized size of the first object is not in the specific range, wherein the visual information corresponds to the identified content that is on the projection surface.

18. An information processing apparatus, comprising:
a processor configured to:
recognize a position of a first object from an image, wherein
the first object is on a projection surface, and
the first object includes content;
recognize a position of a second object from the image, wherein
the second object is on the projection surface, and
the position of the second object is based on the position of the first object;
determine the position of the second object is not in a specific range; and
control projection of visual information onto the projection surface, based on the position of the first object and the determination that the position of the second object is not in the specific range, wherein the visual information corresponds to the content that is on the projection surface.

* * * * *